(12) United States Patent
Okuda (10) Patent No.: US 10,133,164 B2
(45) Date of Patent: Nov. 20, 2018

(54) PROJECTION DISPLAY APPARATUS FOR IMPROVING THE CHROMATICITY OF BLUE LIGHT

(71) Applicant: Panasonic Intellectual Property Management Co., Ltd., Osaka (JP)

(72) Inventor: Michihiro Okuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/590,093

(22) Filed: May 9, 2017

(65) Prior Publication Data

US 2017/0347075 A1 Nov. 30, 2017

(30) Foreign Application Priority Data

May 25, 2016 (JP) .................................. 2016-103818
Mar. 8, 2017 (JP) .................................. 2017-043897

(51) Int. Cl.

| G03B 21/20 | (2006.01) |
|---|---|
| G02B 27/10 | (2006.01) |
| G02B 27/14 | (2006.01) |
| G03B 21/00 | (2006.01) |
| H04N 9/31 | (2006.01) |

(Continued)

(52) U.S. Cl.
CPC ....... *G03B 21/204* (2013.01); *G02B 27/1006* (2013.01); *G02B 27/141* (2013.01); *G03B 21/006* (2013.01); *G03B 21/2033* (2013.01); *G03B 33/08* (2013.01); *H04N 9/3102* (2013.01); *H04N 9/3114* (2013.01); *H04N 9/3158* (2013.01); *H04N 9/3167* (2013.01); *H04N 9/3182* (2013.01); *G02B 27/0994* (2013.01)

(58) Field of Classification Search
CPC ................ G03B 21/204; G03B 21/006; G03B 21/2033; H04N 9/3102; H04N 9/3167
See application file for complete search history.

(56) References Cited

U.S. PATENT DOCUMENTS

| 7,070,300 B2 * | 7/2006 | Harbers | ............. G02B 27/1046 257/E33.071 |
|---|---|---|---|
| 8,820,940 B2 * | 9/2014 | Kita | ..................... G03B 21/204 353/84 |

(Continued)

FOREIGN PATENT DOCUMENTS

JP 2011-128521 6/2011

*Primary Examiner* — Bao-Luan Le
(74) *Attorney, Agent, or Firm* — McDermott Will & Emery LLP (57) ABSTRACT

A projection display apparatus of the present disclosure includes a solid state light source that emits blue light in a first wavelength range; a wheel having a light-emitting body that emits emission light in a second wavelength range closer to the longer wavelengths than the first wavelength range is and adjacent to the first wavelength range, in response to irradiation with the blue light; a light uniformizing element that uniformizes the blue light and the emission light; a light modulation element that modulates light uniformized by the light uniformizing element; and a projection unit that projects the light modulated by the light modulation element. An end of the light-emitting body that the blue light enters has a dichroic coating that partly reflects the blue light and transmits emission light.

8 Claims, 9 Drawing Sheets

(51) Int. Cl.
*G03B 33/08* (2006.01)
*G02B 27/09* (2006.01)

(56) References Cited

U.S. PATENT DOCUMENTS

| | | | | |
|---|---|---|---|---|
| 9,195,123 B2* | 11/2015 | Pettitt | ............ | G03B 21/204 |
| 9,323,046 B2* | 4/2016 | Kita | ............ | G03B 21/204 |
| 9,429,830 B2* | 8/2016 | Nojima | ............ | G03B 21/204 |
| 9,470,886 B2* | 10/2016 | Bartlett | ............ | G02B 26/008 |
| 9,581,805 B2* | 2/2017 | Kita | ............ | G03B 21/204 |
| 9,618,737 B2* | 4/2017 | Khan | ............ | G02B 26/008 |
| 9,664,892 B2* | 5/2017 | King | ............ | G02B 26/008 |
| 9,915,860 B2* | 3/2018 | Akiyama | ............ | G02B 26/008 |
| 2005/0270775 A1* | 12/2005 | Harbers | ............ | G02B 27/1046 362/231 |
| 2011/0310363 A1* | 12/2011 | Kita | ............ | G03B 21/204 353/98 |
| 2013/0242534 A1* | 9/2013 | Pettitt | ............ | G03B 21/204 362/84 |
| 2014/0204558 A1* | 7/2014 | Bartlett | ............ | G02B 26/008 362/84 |
| 2014/0211169 A1* | 7/2014 | Kitano | ............ | G03B 21/204 353/31 |
| 2014/0226306 A1* | 8/2014 | Khan | ............ | G02B 26/008 362/84 |
| 2014/0253882 A1* | 9/2014 | King | ............ | G02B 26/008 353/31 |
| 2014/0327886 A1* | 11/2014 | Kita | ............ | G03B 21/204 353/31 |
| 2015/0205189 A1* | 7/2015 | Nojima | ............ | H01L 33/50 353/31 |
| 2016/0033854 A1* | 2/2016 | Pettitt | ............ | G03B 21/204 353/7 |
| 2016/0202467 A1* | 7/2016 | Kita | ............ | G03B 21/204 353/84 |
| 2016/0238923 A1* | 8/2016 | Tanaka | ............ | G02B 26/007 |
| 2016/0241822 A1* | 8/2016 | Takagi | ............ | H04N 9/3111 |
| 2017/0199451 A1* | 7/2017 | Akiyama | ............ | G02B 26/008 |
| 2017/0205695 A1* | 7/2017 | Hu | ............ | G03B 21/204 |

* cited by examiner

PROJECTION DISPLAY APPARATUS FOR IMPROVING THE CHROMATICITY OF BLUE LIGHT

BACKGROUND

1. Technical Field

The present disclosure relates to a projection display apparatus using a light source device that includes a light source discharging blue excitation light and a light-emitting body emitting light in response to the excitation light.

2. Description of the Related Art

Patent literature 1 discloses a projector capable of projecting high-quality color images that includes a light source device with its distribution of the wavelength of source light in the blue wavelength band expanded, where the light source device includes a blue laser emitting device as an excitation light source, diffuses the light emitted from the excitation light source, and uses the diffused light as source light in the blue wavelength band.

CITATION LIST

Patent Literature

PTL 1: Japanese Patent Unexamined Publication No. 2011-128521

SUMMARY

The present disclosure provides a projection display apparatus capable of making the chromaticity of blue light proper.

A projection display apparatus of the present disclosure includes a solid state light source that emits blue light in a first wavelength range; a wheel having a light-emitting body that emits emission light in a second wavelength range closer to the longer wavelengths than the first wavelength range is and adjacent to the first wavelength range, in response to irradiation with the blue light; a light uniformizing element that uniformizes the blue light and the emission light; a light modulation element that modulates light uniformized by the light uniformizing element; and a projection unit that projects the light modulated by the light modulation element. An end of the light-emitting body that the blue light enters has a dichroic coating that partly reflects the blue light and transmits emission light.

The present disclosure improves the chromaticity of blue light displayed by a projection display apparatus.

DETAILED DESCRIPTION OF THE PREFERRED EMBODIMENTS

Hereinafter, a detailed description is made of some embodiments with reference to the related drawings as appropriate. However, a detailed description more than necessary may be omitted, such as a description of a well-known item and a duplicate description for a substantially identical component, to avoid an unnecessarily redundant description and to allow those skilled in the art to easily understand the following description.

Note that the inventor provides accompanying drawings and the following description for those skilled in the art to well understand the disclosure and does not intend to limit the subjects described in the claims by the drawings and the description.

First Exemplary Embodiment

Projection Display Apparatus

Figure 1:
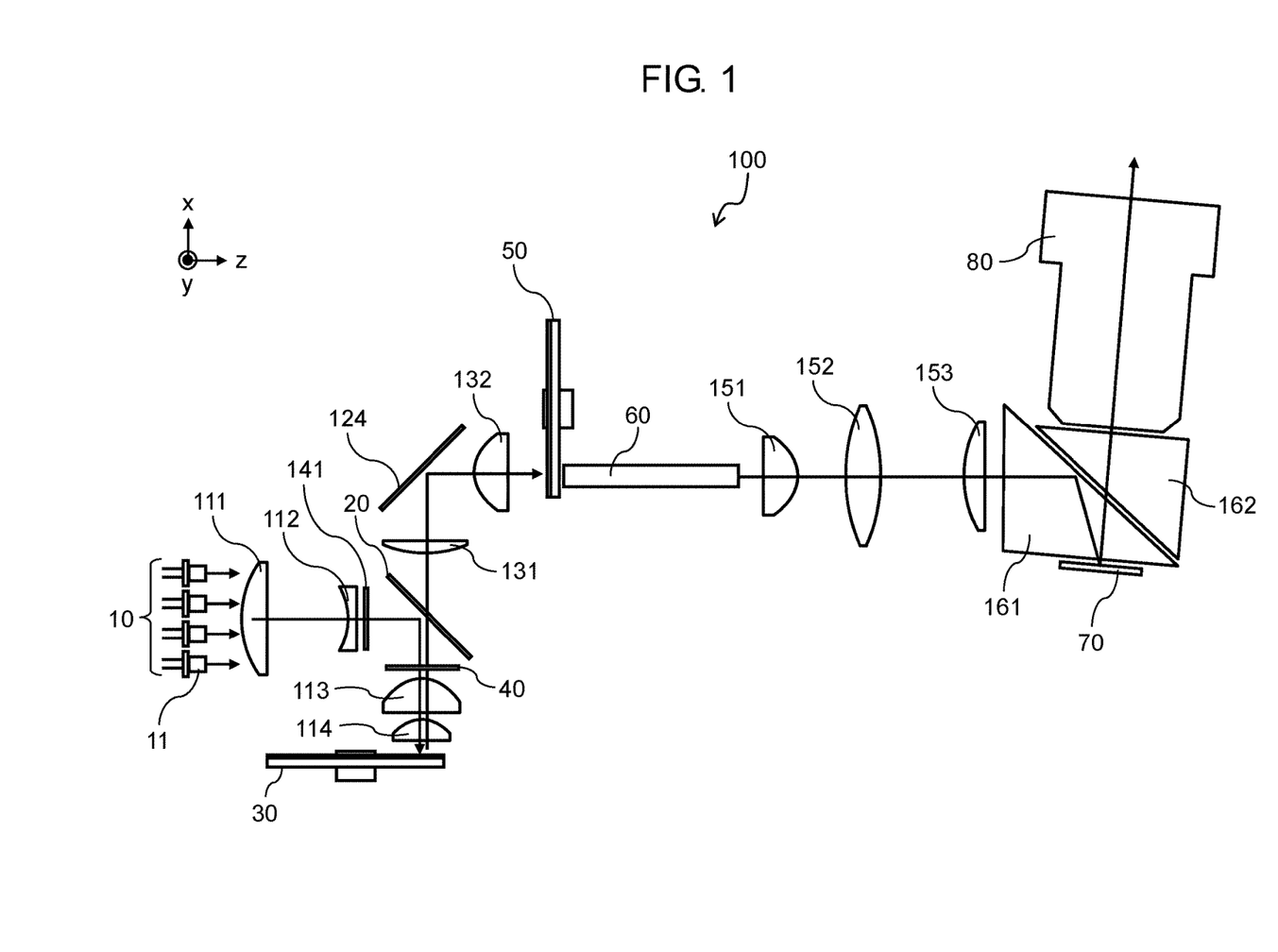
FIG. 1 illustrates a projection display apparatus according to the first embodiment.

Hereinafter, a description is made of the configuration of a projection display apparatus according to the first embodiment using FIGS. 1 through 6. FIG. 1 illustrates the optical configuration of projection display apparatus 100 according to the first embodiment. In the first embodiment, exemplification is made of a case where red component light R, green component light G, blue component light B (first blue component light $B_1$+second blue component light $B_2$), and yellow component light Y are used for image light.

As shown in FIG. 1, projection display apparatus 100 first includes light source unit 10, dichroic mirror 20, phosphor wheel 30, quarter-wave plate 40, color wheel 50, rod integrator 60, digital mirror device (DMD) 70, and projection unit 80.

Light source unit 10 is composed of multiple solid state light sources such as a laser diode (LD) and a light emitting diode (LED). In this embodiment, a laser diode, especially laser diode 11 that emits blue light, is used as a solid state light source.

Emitted light from light source unit 10 is blue light with a wavelength of 455 nm, and is used as image light (first blue component light $B_1$) as well as excitation light for exciting a phosphor. Here, the wavelength of emitted light from light source unit 10 is not limited to 455 nm, but it may be between 440 nm and 460 nm for example. The wavelength of this blue light is an example of the first wavelength range.

Blue light emitted from light source unit 10 passes through lens 111, lens 112, and diffusion plate 141, and enters dichroic mirror 20. Dichroic mirror 20 reflects first blue component light $B_1$ (excitation light). First blue component light $B_1$ reflected by dichroic mirror 20 is collected by lenses 113 and 114, and excites the phosphor of phosphor wheel 30 for emitting light.

Emitted light from light source unit 10 is s-polarized light. Dichroic mirror 20 reflects first blue component light $B_1$ (s-polarized light) and transmits yellow emission light Y emitted from phosphor wheel 30, green emission light $G_1$ emitted from phosphor wheel 30, and first blue component light $B_1$ (p-polarized light) reflected by phosphor wheel 30. In other words, dichroic mirror 20 reflects first blue component light $B_1$ s-polarized, and transmits first blue component light $B_1$ p-polarized, yellow emission light Y unpolarized, and green emission light $G_1$ unpolarized.

Figure 2:
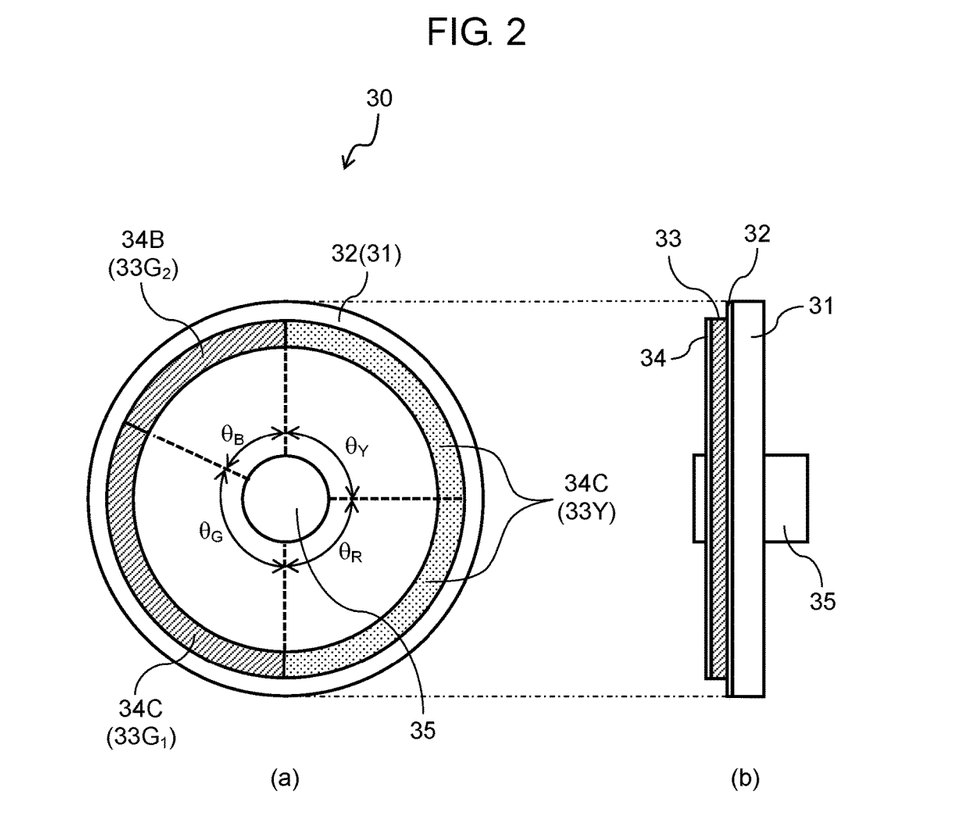
FIG. 2 illustrates a phosphor wheel according to the first embodiment.

As shown in FIG. 2, phosphor wheel 30 is composed of substrate 31, reflective coating 32 formed on substrate 31, phosphor coating 33 coated on reflective coating 32 in a ring shape, and motor 35 for rotating substrate 31. FIG. 2 (a) illustrates the phosphor wheel viewed toward direction −x of FIG. 1. FIG. 2 (b) illustrates the phosphor wheel viewed toward direction z of FIG. 1.

As shown in FIG. 2, dielectric multilayer coating 34 is formed on phosphor coating 33. As shown in FIG. 2 (a), phosphor coating 33 is composed of yellow phosphor coating 33Y, the first green phosphor coating $33G_1$, and second green phosphor coating $33G_2$. As shown in FIG. 2 (a), dielectric multilayer coating 34 is composed of antireflection coating 34C and blue partially reflective coating 34B. In FIG. 2 (a), a mark in parentheses indicates that a component of the mark without parentheses is positioned in the upper layer. In other words, this represents that reflective coating 32 is disposed on substrate 31; antireflection coating 34C is disposed on yellow phosphor coating 33Y and the first green phosphor coating $33G_1$; and blue partially reflective coating 34B is disposed on second green phosphor coating $33G_2$. Phosphor coating 33 is an example of the light-emitting body, and phosphor wheel 30 is an example of the wheel.

Phosphor coating 33 can be produced by the following process for example. That is, a powder ceramic phosphor is mixed into an adhesive agent (silicone resin), which is coated onto a substrate, and then hardened at a high temperature. Examples of a ceramic phosphor used for phosphor coating 33 include YAG phosphor and LAG phosphor, each of which is a cerium-activated garnet structure phosphor.

As shown in FIG. 2 (a), phosphor wheel 30 is circumferentially composed of four segments. First segment (angle region $\theta_R$) is a region for generating red component light R; second segment (angle region $\theta_G$), for green component light G; third segment (angle region $\theta_B$), for blue component light B; and fourth segment (angle region $\theta_Y$), for yellow component light Y.

Yellow phosphor coating 33Y includes phosphor Y that emits yellow emission light Y in response to first blue component light $B_1$ (excitation light) emitted from light source unit 10. Yellow phosphor coating 33Y is formed in the fourth segment and the first segment (given angle region $\theta_Y + \theta_R$) in the ring-shaped region where phosphor coating 33 is formed. Here, yellow phosphor coating 33Y is a region irradiated with first blue component light $B_1$ (excitation light) while phosphor wheel 30 is rotating. In other words, first blue component light $B_1$ is collected onto yellow phosphor coating 33Y by lens 114.

First green phosphor coating $33G_1$ includes phosphor $G_1$ that emits green emission light $G_1$ in response to first blue component light $B_1$ (excitation light) emitted from light source unit 10. First green phosphor coating $33G_1$ is formed in the second segment (given angle region $\theta_G$) in the ring-shaped region where phosphor coating 33 is formed. Here, first green phosphor coating $33G_1$ is a region irradiated with first blue component light $B_1$ (excitation light) while phosphor wheel 30 is rotating. In other words, first blue component light $B_1$ is collected onto first green phosphor coating $33G_1$ by lens 114.

Second green phosphor coating $33G_2$ includes phosphor $G_2$ that emits green emission light $G_2$ in response to first blue component light $B_1$ (excitation light) emitted from light source unit 10. At this moment, green emission light $G_2$ contains second blue component light $B_2$ for adjusting the chromaticity of blue component light B that is image light. Second green phosphor coating $33G_2$ is formed in the third segment (given angle region $\theta_B$) in the ring-shaped region where phosphor coating 33 is formed. Blue partially reflective coating 34B partly reflects incoming first blue component light $B_1$ (excitation light) and transmits the rest, and transmits green emission light $G_2$. Blue partially reflective coating 34B is an example of a dichroic coating. Here, second green phosphor coating $33G_2$ is a region irradiated with first blue component light $B_1$ (excitation light) while phosphor wheel 30 is rotating. In other words, first blue component light $B_1$ is collected onto second green phosphor coating $33G_2$ by lens 114.

Figure 3A:
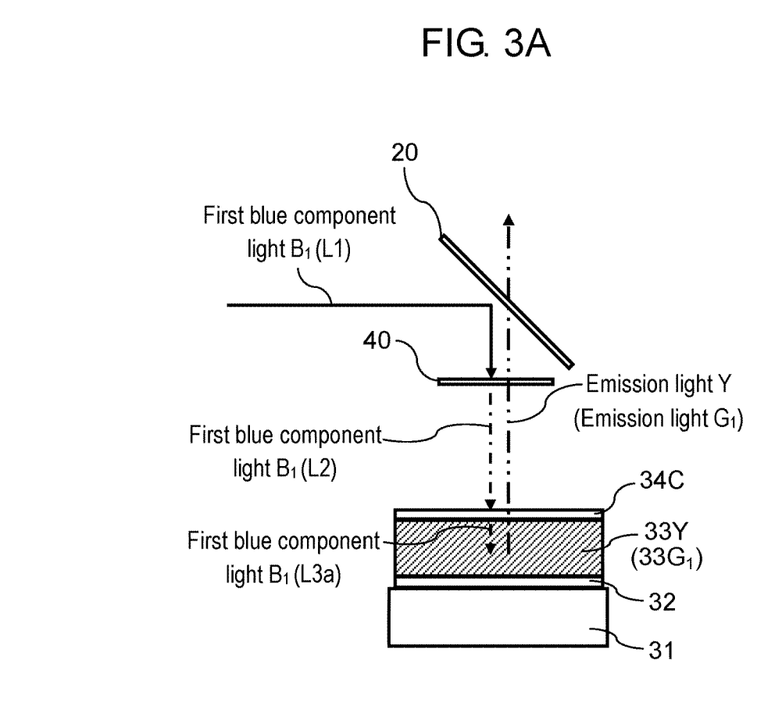
FIG. 3A illustrates the principle of color (yellow and green) generation according to the first embodiment.
Figure 3B:
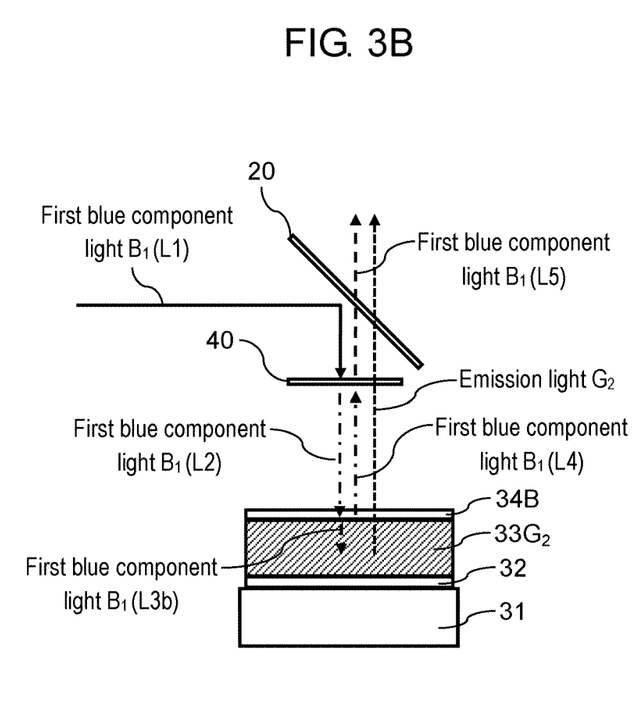
FIG. 3B illustrates the principle of color (blue) generation according to the first embodiment.

Next, a description is made of the principle of color generation in the periphery of phosphor wheel 30 using FIGS. 3A and 3B.

FIG. 3A shows a case where one of angle regions $\theta_Y$, $\theta_R$, and $\theta_G$ of phosphor wheel 30 is irradiated with first blue component light $B_1$ (excitation light). In this embodiment, first blue component light $B_1$ (excitation light L1) s-polarized is emitted from light source unit 10. Excitation light L1 passes through quarter-wave plate 40 to become first blue component light $B_1$ (excitation light L2) circularly-polarized. Excitation light L2 passes through antireflection coating 34C (excitation light L3a); excitation light L3a retains light intensity of 95% or more of excitation light L2 owing to antireflection coating 34C to be emitted to yellow phosphor coating 33Y or the first green phosphor coating 33G1.

Yellow phosphor coating 33Y or the first green phosphor coating $33G_1$ is irradiated with excitation light L3a to emit yellow emission light Y or green emission light $G_1$. Yellow emission light Y and green emission light $G_1$ are emitted 360° omnidirectionally, where light emitted toward substrate 31 reflected by reflective coating 32. Hence, yellow emission light Y and green emission light $G_1$ are emitted toward quarter-wave plate 40, opposite to the traveling direction of excitation light L3a. Here, yellow emission light Y and green emission light $G_1$ are fluorescent light and thus unpolarized light, which is still unpolarized light after passing through quarter-wave plate 40.

FIG. 3B shows a case where angle region θB of phosphor wheel 30 is irradiated with first blue component light $B_1$ (excitation light). In this embodiment, first blue component light $B_1$ (excitation light L1) s-polarized is emitted from light source unit 10. Excitation light L1 passes through quarter-wave plate 40 to become first blue component light $B_1$ (excitation light L2) circularly-polarized. Excitation light L2 35% passes through blue partially reflective coating 34B to become excitation light L3b, and is emitted to second green phosphor coating $33G_2$. The rest (65%) of excitation light L2 reflected by blue partially reflective coating 34B to become image light L4.

Second green phosphor coating $33G_2$ is irradiated with first blue component light $B_1$ (L3b) to emit green emission light $G_2$. Green emission light $G_2$ is emitted 360° omnidirectionally, where light emitted toward substrate 31 reflected by reflective coating 32. Hence, green emission light $G_2$ is emitted toward quarter-wave plate 40, opposite to the traveling direction of excitation light L3b. Blue partially reflective coating 34B transmits green emission light $G_2$. More specifically, blue partially reflective coating 34B is a dichroic coating that transmits 35% (reflects 65%) of light in the wavelength range (455 nm) of first blue component light $B_1$ and transmits light in the wavelength range (460 nm to 750 nm) of green emission light $G_2$. Image light L4 reflected by blue partially reflective coating 34B is first blue component light $B_1$ circularly-polarized, similarly to excitation light L2. Image light L4 passes through quarter-wave plate 40 once again to become first blue component light $B_1$ (image light L5) p-polarized. Here, the transmittance of blue partially reflective coating 34B should be adjusted as needed, appropriately to between 10% and 60%.

In this way, light emitted through dichroic mirror 20 becomes yellow emission light Y in angle region $\theta_Y+\theta_R$; green emission light $G_1$ in angle region $\theta_G$; and combined light of first blue component light $B_1$ (image light L5) and green emission light $G_2$ in angle region $\theta_B$, according to rotation of phosphor wheel 30.

Referring back to FIG. 1, light emitted from dichroic mirror 20 passes through lens 131, reflected by mirror 124, with its optical path bent perpendicularly, and enters color wheel 50 through lens 132.

Figure 4:
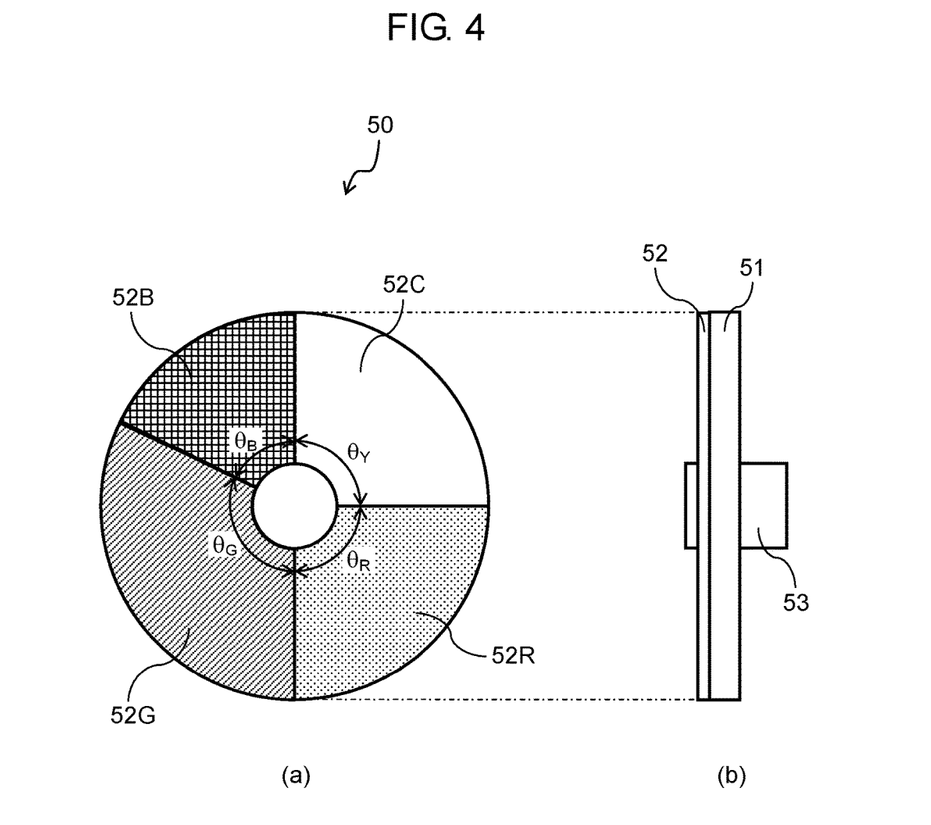
FIG. 4 illustrates a color wheel according to the first embodiment.

As shown in FIG. 4, color wheel 50 is composed of transparent substrate 51, dielectric multilayer coating 52 formed on substrate 51, and motor 53 for rotating substrate 51. FIG. 4 (a) illustrates the color wheel viewed toward direction z of FIG. 1. FIG. 4 (b) illustrates the color wheel viewed toward direction −y of FIG. 1.

As shown in FIG. 4, dielectric multilayer coating 52 is composed of red-transmissive dichroic coating 52R formed in given angle region $\theta_R$ (the first segment), green-transmissive dichroic coating 52G formed in given angle region $\theta_G$ (the second segment), blue-transmitting dichroic coating 52B formed in given angle region $\theta_B$ (the third segment), and antireflection coating 52C formed in given angle region $\theta_Y$ (the fourth segment).

Color wheel 50 is controlled to rotate synchronously with phosphor wheel 30. More specifically, while light is entering angle region $\theta_R$ of phosphor wheel 30, light is entering angle region $\theta_R$ of color wheel 50. While light is entering angle region $\theta_G$ of phosphor wheel 30, light is entering angle region $\theta_G$ of color wheel 50; angle region $\theta_B$ of phosphor wheel 30, angle region $\theta_B$ of color wheel 50; and angle region $\theta_Y$ of phosphor wheel 30, angle region $\theta_Y$ of color wheel 50.

In this way, light generated in angle regions $\theta_R$, $\theta_G$, $\theta_B$, and $\theta_Y$ by means of phosphor wheel 30 and color wheel 50 is emitted in a time-division manner. That is, phosphor wheel 30 and color wheel 50 generate light of color components including red component light R, green component light G, blue component light B, and yellow component light Y, and emit the light in a time-division manner.

Hereinafter, a description is made of color generation in the respective angle regions (segments) referring to each spectrum shown in FIGS. 5A through 5C.

Figure 5A:
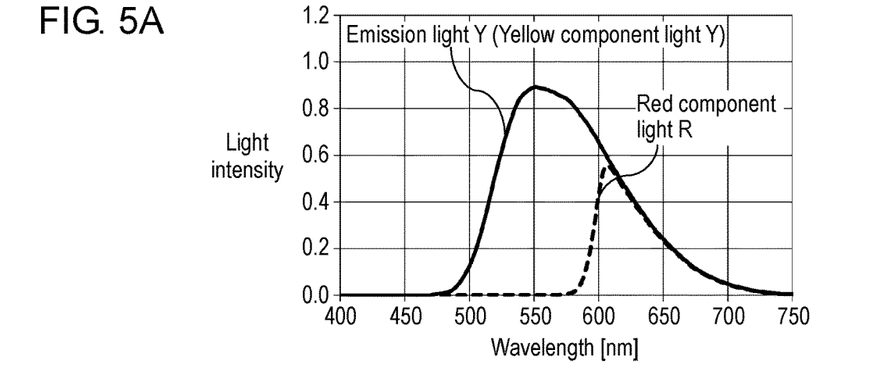
FIG. 5A is a spectrum of yellow component light in a projection display apparatus according to the first embodiment.

In angle region $\theta_R$, yellow emission light Y (the solid line in FIG. 5A) is emitted from yellow phosphor coating 33Y of phosphor wheel 30 and passes through red-transmissive dichroic coating 52R of color wheel 50 to become red component light R (the broken line in FIG. 5A). Adjusting the spectral characteristics of red-transmissive dichroic coating 52R of color wheel 50 allows the color purity of red component light R to be controlled.

Figure 5B:
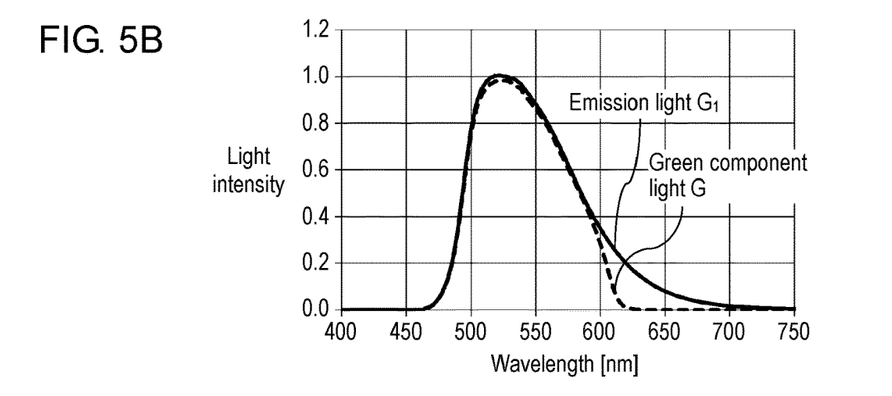
FIG. 5B is a spectrum of green component light in the projection display apparatus according to the first embodiment.
Figure 5C:
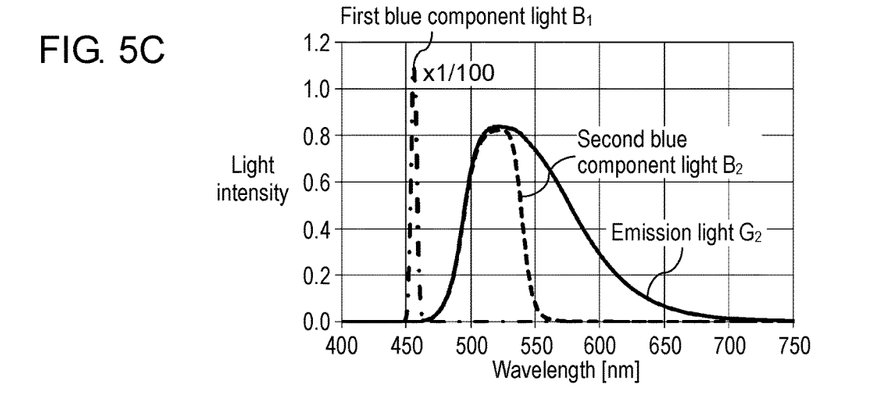
FIG. 5C is a spectrum of blue component light in the projection display apparatus according to the first embodiment.

In angle region $\theta_G$, green emission light $G_1$ (the solid line in FIG. 5B) is emitted from the first green phosphor coating 33$G_1$ of phosphor wheel 30 and passes through green-transmissive dichroic coating 52G of color wheel 50 to become green component light G (the broken line in FIG. 5B). Adjusting the spectral characteristics of green-transmissive dichroic coating 52G of color wheel 50 allows the color purity of green component light G to be controlled.

In angle region $\theta_B$, green emission light $G_2$ (green emission light $G_2$ contains second blue component light $B_2$) from second green phosphor coating 33$G_2$ of phosphor wheel 30 is combined with first blue component light $B_1$ reflected by blue partially reflective coating 34B, which then passes through blue-transmitting dichroic coating 52B of color wheel 50 to become blue component light B. Blue-transmitting dichroic coating 52B transmits first blue component light $B_1$ as well as green emission light $G_2$ with the shorter wavelengths to extract second blue component light $B_2$. Second blue component light $B_2$ is mixed with first blue component light $B_1$ of a wavelength of 455 nm for an optimum blue chromaticity. Here, the wavelength range between 460 nm and 750 nm, which is a wavelength range of green emission light $G_2$, is an example of the second wavelength range.

In this embodiment, the dominant wavelength of second blue component light $B_2$ is 515 nm, but not limited to it. It is desirable that second green phosphor coating 33$G_2$ is selected and the spectral characteristics of blue-transmitting dichroic coating 52B is designed so that the dominant wavelength of second blue component light $B_2$ falls between 470 nm and 530 nm. The wavelength range between 460 nm and 560 nm, which is the wavelength range of second blue component light $B_2$ with a dominant wavelength of 515 nm in this embodiment, is an example of the third wavelength range. In FIG. 5C, first blue component light $B_1$ is represented with a scale of 1/100. Here, second green phosphor coating 33$G_2$ of phosphor wheel 30 may be either identical to or different from the first green phosphor coating 33$G_1$.

In angle region $\theta_Y$, yellow emission light Y is emitted from yellow phosphor coating 33Y of phosphor wheel 30, and passes through antireflection coating 52C of color wheel 50 to become yellow component light Y. Yellow emission light Y passes through antireflection coating 52C of color wheel 50, which causes color change at a negligible level.

Referring back to FIG. 1, light emitted from color wheel 50 enters rod integrator 60. Rod integrator 60 is a solid rod made of a transparent component such as glass. Rod integrator 60 uniformizes light emitted from light source unit 10 and from phosphor wheel 30. Here, rod integrator 60 may be a hollow rod with its inner wall made of a mirror surface. Rod integrator 60 is an example of a light uniformizing element.

Light emitted from rod integrator 60 passes through lenses 151, 152, and 153, enters a total reflection prism composed of triangular prisms 161 and 162, and then enters DMD 70.

DMD 70 modulates each color component light generated by light source unit 10, phosphor wheel 30, and color wheel 50, in a time-division manner. Minutely, DMD 70 is composed of multiple minute mirrors, which are movable. Each minute mirror basically corresponds to one pixel. DMD 70 changes the angle of each minute mirror according to an image signal (modulation) to change whether or not DMD 70 reflects light toward projection unit 80.

DMD 70 expresses gradation of each color correspondingly to angle regions $\theta_R$, $\theta_G$, $\theta_B$, and $\theta_Y$ described in FIGS. 2 and 4. Specifically, while angle region $\theta_R$ is being irradiated with light, DMD 70 modulates red component light R (image light). While angle region $\theta_G$ is being irradiated with light, DMD 70 modulates green component light G (image light); angle region $\theta_B$, blue component light B (image light); and angle region $\theta_Y$, yellow component light Y (image light). DMD 70 is an example of a light modulation element.

Image light generated by DMD 70 modulating passes through triangular prisms 161 and 162 and enters projection unit 80. Image light that has entered projection unit 80 is projected on a screen (not shown) in an enlarged view.

Figure 6:
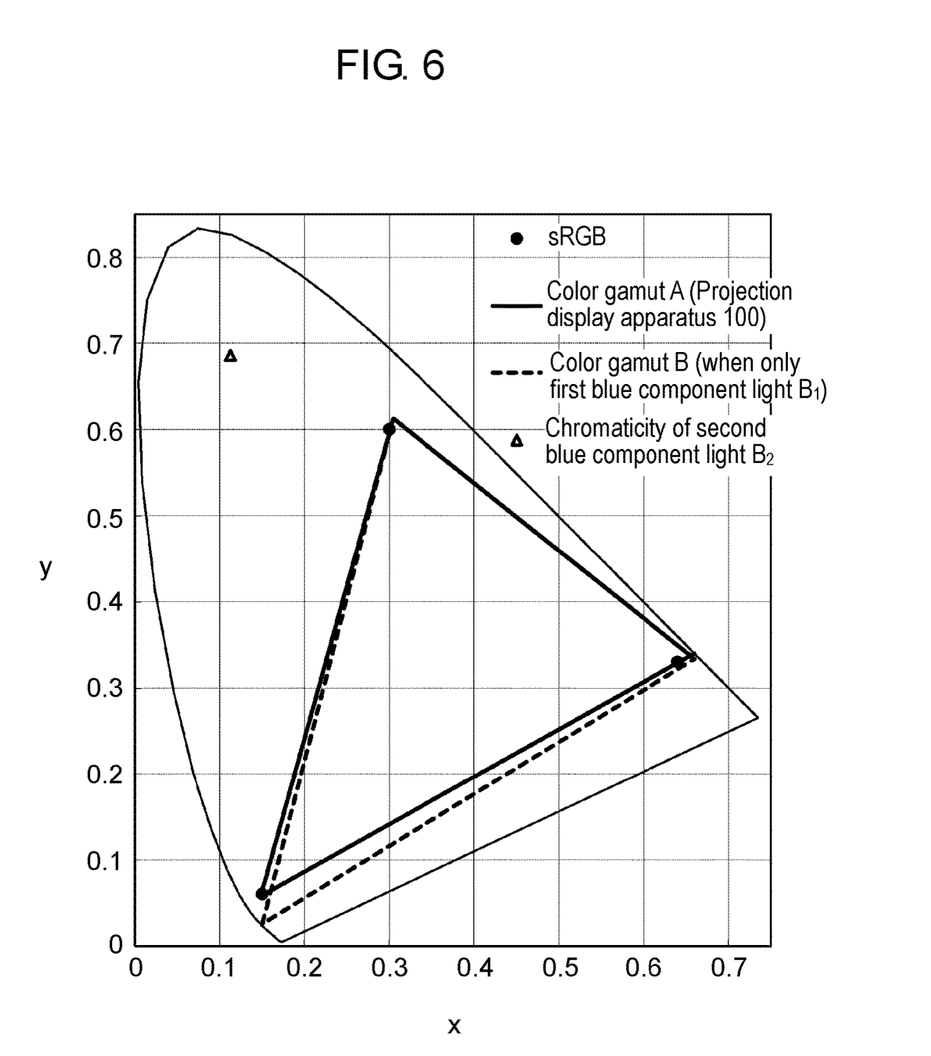
FIG. 6 is a chromaticity diagram for illustrating advantages of the first embodiment.

FIG. 6, a chromaticity diagram, indicates that color gamut A of projection display apparatus 100 according to this embodiment includes sRGB (only each color point is shown in FIG. 6). The chromaticity of second blue component light $B_2$ is indicated by the triangle in FIG. 6. Second blue component light $B_2$ is mixed with first blue component light $B_1$ to normalize the blue chromaticity.

Meanwhile, when only first blue component light $B_1$, not second blue component light $B_2$, is used for image light, FIG. 6 indicates that color gamut B does not include sRGB.

Effects and Advantages

In the first embodiment, blue partially reflective coating 34B is formed on second green phosphor coating $33G_2$, which allows second blue component light $B_2$ to be mixed with first blue component light $B_1$, thus providing a color gamut that includes sRGB, which cannot be included in first blue component light $B_1$.

Second Exemplary Embodiment

Figure 7:
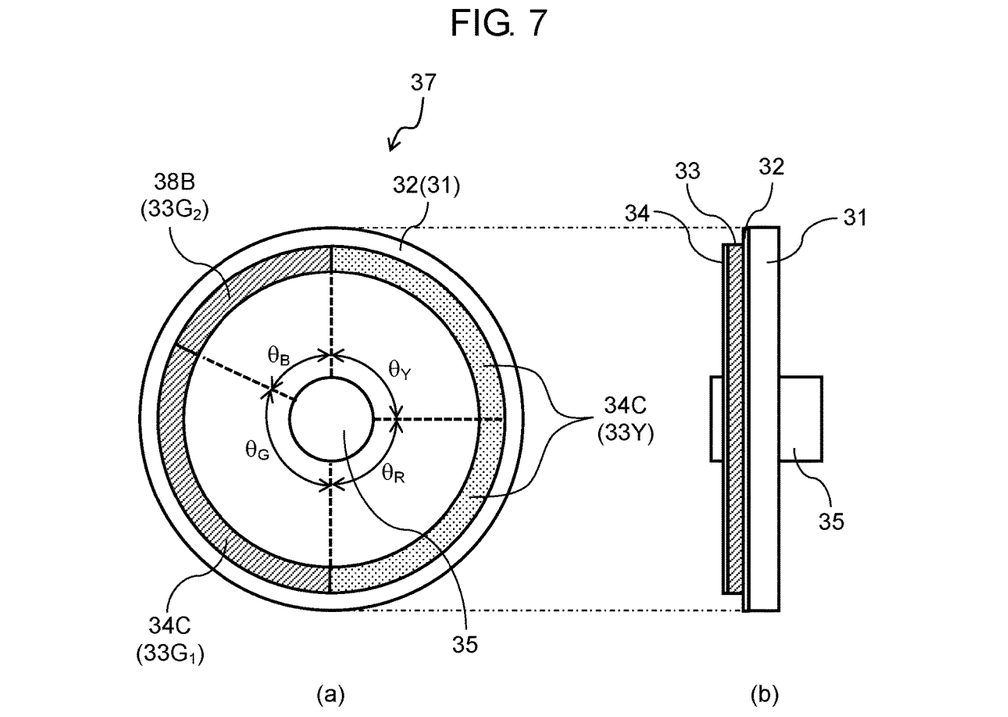
FIG. 7 illustrates a phosphor wheel according to the second exemplary embodiment.
Figure 9:
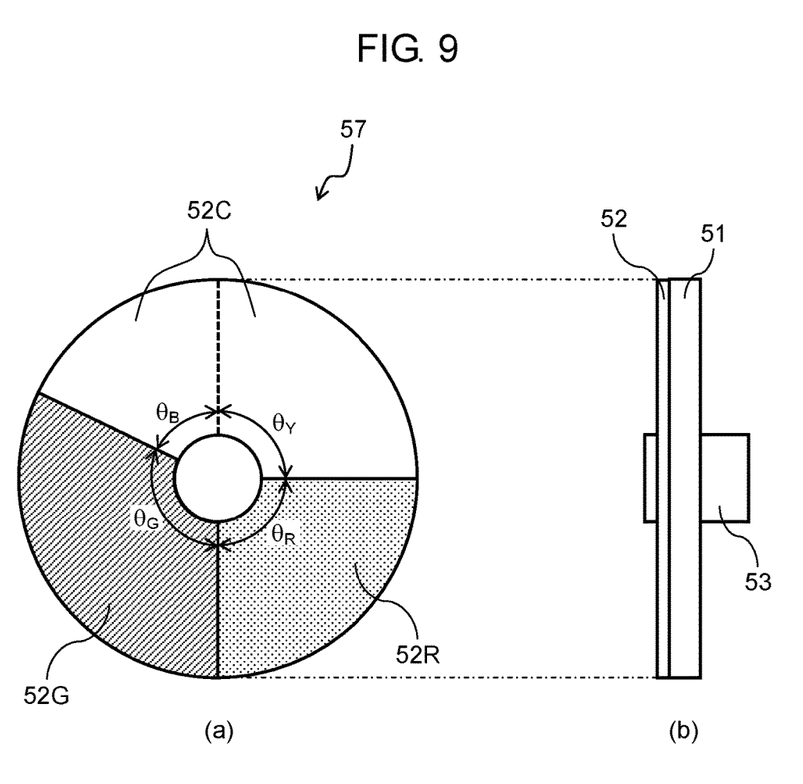
FIG. 9 illustrates a color wheel according to the second embodiment.

In the second exemplary embodiment, phosphor wheel 37 and color wheel 57 are used instead of phosphor wheel 30 and color wheel 50 described in the first embodiment. The other components are the same as those of the first embodiment, and thus their description is omitted.

Figure 8:
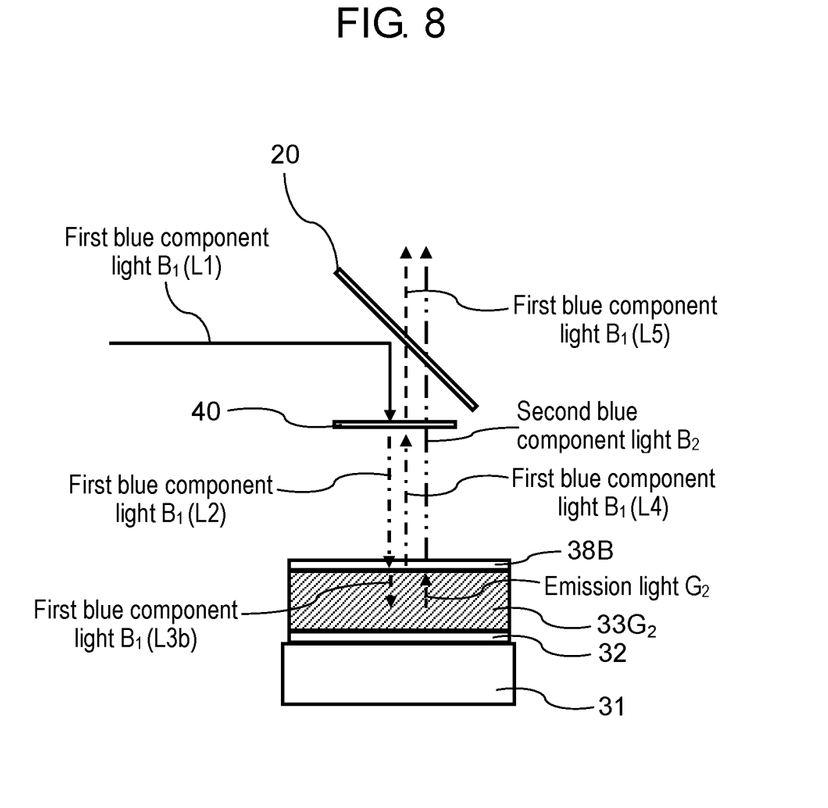
FIG. 8 illustrates the principle of color (blue) generation according to the second embodiment.

FIG. 7 illustrates phosphor wheel 37 used in the second embodiment. In the first embodiment, as shown in FIG. 2, blue partially reflective coating 34B is formed on the surface of second green phosphor coating $33G_2$ formed in angle region $\theta_B$ of phosphor wheel 30, where blue partially reflective coating 34B has characteristics in which it transmits part of first blue component light $B_1$, reflects the rest, and transmits green emission light $G_2$. Color wheel 50 extracts second blue component light $B_2$ from green emission light $G_2$. In the second embodiment, as shown in FIG. 7, dichroic coating 38B is formed on the surface of second green phosphor coating $33G_2$ formed in angle region $\theta_B$ of phosphor wheel 37, where dichroic coating 38B has characteristics in which it transmits part of first blue component light $B_1$, reflects the rest, and transmits green emission light $G_2$ with the shorter wavelengths (second blue component light $B_2$). In angle region $\theta_B$, as shown in FIG. 8, dichroic coating 38B extracts second blue component light $B_2$ from green emission light $G_2$.

FIG. 9 shows color wheel 57 used in the second embodiment. Color wheel 57 is composed of transparent substrate 51, dielectric multilayer coating 52 formed on this substrate 51, and motor 53 for rotating substrate 51. FIG. 9 (*a*) illustrates color wheel 57 viewed toward direction z of FIG. 1. FIG. 9 (*b*) illustrates color wheel 57 viewed toward direction –y of FIG. 1.

In the first embodiment, as shown in FIG. 4, blue-transmitting dichroic coating 52B is formed in angle region $\theta_B$ of color wheel 50. In the second embodiment, as shown in FIG. 9, antireflection coating 52C is formed in angle region $\theta_B$ of color wheel 57, as well as in angle region $\theta_Y$. Thus, first blue component light $B_1$ and second blue component light $B_2$ emitted from phosphor wheel 37 pass through antireflection coating 52C in angle region $\theta_B$ of color wheel 57, which causes color change at a negligible level.

Other Exemplary Embodiments

Hereinbefore, the first and second embodiments are described to exemplify the technology disclosed in this application. The technology of the disclosure, however, is not limited to these embodiments, but is applicable to other embodiments appropriately devised through modification, substitution, addition, and omission for example. Further, some components described in the first and second embodiments can be combined to devise a new embodiment. Hence, other exemplary embodiments are exemplified hereinafter.

In the first and second embodiments, DMD 70 is exemplified as a light modulation element, but an embodiment is not limited to DMD 70. The light modulation element may be a single liquid crystal display panel or may be composed of three panels (red, green, and blue liquid crystal display panels). The liquid crystal display panel may be either transmissive or reflective.

In the first and second embodiments, a phosphor wheel is exemplified as a phosphor generating emission light, but an embodiment is not limited to a phosphor wheel. The phosphor may be a static inorganic phosphor ceramic.

The above-described embodiments are for exemplification of the technologies in the disclosure. Hence, the embodiments may undergo various kinds of change, substitution, addition, and/or omission within the scope of the claims and their equivalent technology.

INDUSTRIAL APPLICABILITY

The present disclosure is applicable to a projection display apparatus such as a projector.

What is claimed is:

1. A projection display apparatus comprising:
    a solid state light source discharging blue light in a first wavelength range;
    a wheel having a light-emitting body emitting emission light in a second wavelength range closer to longer wavelengths than the first wavelength range is and adjacent to the first wavelength range, in response to irradiation with the blue light;
    a light uniformizing element uniformizing the blue light and the emission light;
    a light modulation element modulating light uniformized by the light uniformizing element; and
    a projection unit projecting the light modulated by the light modulation element,
    wherein a first surface of the light-emitting body that the blue light enters has a dichroic coating that reflects and transmits the blue light and transmits the emission light,
    the emission light in the second wavelength range contains light in a third wavelength range adjacent to the first wavelength range,
    the wheel generates light of color components containing at least red component light, green component light and blue component light, and emits the light of color components in a time-division manner, the blue component light is composed of the light in the first wavelength range and the third wavelength range, the dichroic coating is provided on an area of the first surface at which the blue component light is produced, and transmits the light in the third wavelength range, and prevents light in a longer wavelength than the third wavelength range from passing, and the third wavelength range is narrower than the second wavelength range.

2. The projection display apparatus of claim 1, wherein transmittance of the blue light through the dichroic coating is 10% to 60%.

3. The projection display apparatus of claim 1, wherein the wheel has a reflection coating at a second surface of the light-emitting body.

4. The projection display apparatus of claim 1, wherein the light uniformizing element comprises a solid transparent rod.

5. A projection display apparatus comprising:

a solid state light source discharging blue light in a first wavelength range;

a wheel having a light-emitting body emitting emission light in a second wavelength range closer to longer wavelengths than the first wavelength range is and adjacent to the first wavelength range, in response to irradiation with the blue light;

a light uniformizing element uniformizing the blue light and the emission light;

a light modulation element modulating light uniformized by the light uniformizing element;

a projection unit projecting the light modulated by the light modulation element; and a color wheel that the blue light and emission light enter, wherein a first surface of the light-emitting body that the blue light enters has a dichroic coating that reflects and transmits the blue light and transmits the emission light, the emission light in the second wavelength range contains light in a third wavelength range adjacent to the first wavelength range, the wheel generates light of color components containing at least red component light, green component light and blue component light, and emits the light of color components in a time-division manner, the blue component light is composed of the light in the first wavelength range and the third wavelength range, the color wheel has an area which transmits the light in the third wavelength range and prevents light in a longer wavelength than the third wavelength range from transmitting, and the third wavelength range is narrower than the second wavelength range.

6. The projection display apparatus of claim 5, wherein transmittance of the blue light through the dichroic coating is 10% to 60%.

7. The projection display apparatus of claim 5, wherein the wheel has a reflection coating at a second surface of the light-emitting body.

8. The projection display apparatus of claim 5, wherein the light uniformizing element comprises a solid transparent rod.

* * * * *